United States Patent
Nilsson et al.

(10) Patent No.: US 6,758,248 B2
(45) Date of Patent: Jul. 6, 2004

(54) DEVICE AND METHOD IN A TREE HARVESTER HEAD

(75) Inventors: Gunnar Nilsson, Röbäck (SE); Leo Samson, Kamloops (CA); Tommy Englund, Umeå (SE)

(73) Assignee: Partek Forest AB, Umeå (SE)

( * ) Notice: Subject to any disclaimer, the term of this patent is extended or adjusted under 35 U.S.C. 154(b) by 0 days.

(21) Appl. No.: 10/169,228

(22) PCT Filed: Dec. 8, 2000

(86) PCT No.: PCT/SE00/02470
§ 371 (c)(1),
(2), (4) Date: Sep. 19, 2002

(87) PCT Pub. No.: WO01/52632
PCT Pub. Date: Jul. 26, 2001

(65) Prior Publication Data
US 2003/0111137 A1 Jun. 19, 2003

(30) Foreign Application Priority Data
Dec. 28, 1999 (SE) ............................... 9904809

(51) Int. Cl.$^7$ ............................................. A01G 23/095
(52) U.S. Cl. .................. 144/343; 144/208.2; 144/24.13
(58) Field of Search ................................. 144/335, 343, 144/4.1, 24.12, 208.1, 208.2, 336, 338, 24.13

(56) References Cited

U.S. PATENT DOCUMENTS 5,219,010 A * 6/1993 Eriksson .................. 144/24.13
5,732,754 A    3/1998 Moisio
5,975,168 A * 11/1999 Ericksson ................. 144/24.13

FOREIGN PATENT DOCUMENTS

| DE | 2606179 A1 | 8/1976 |
| SE | 416027 B | 11/1980 |
| SE | 459796 B | 8/1989 |

* cited by examiner

Primary Examiner—Allen Ostrager
Assistant Examiner—Shelley M Self
(74) Attorney, Agent, or Firm—Ware, Fressola, Van der Sluys & Adolphson LLP

(57) ABSTRACT

In a device and a method for a tree harvester head for trimming tree trunks, the device includes a frame (1) supporting feed rollers (2), one or more trimming knives (4) that pivot towards and away from the tree trunk, as well as a trimming knife (6) permanently fixed to the frame (1) and with a radius of curvature that is essentially equivalent to the radii of curvature of the pivoting trimming knives (4). A complementary trimming knife (7) is arranged in a displaceable manner at the frame and affected by a force of spring tension (9) in a direction towards the tree trunk that is to be worked, whereby the complementary trimming knife (7) has an area of grip around the tree trunk that is significantly less than the area of grip of the pivoting trimming knives (4) or the fixed trimming knife (6) when working the butt end of the trunk, and an area of grip around the tree trunk that is greater than the area of grip of the pivoting trimming knives (4) or the fixed trimming knife (6) when working the top end of the trunk for trimming the trunk from its butt end to its top end.

10 Claims, 3 Drawing Sheets

DEVICE AND METHOD IN A TREE HARVESTER HEAD

BACKGROUND OF TEE INVENTION

1. Technical Field of the Invention

The present invention relates to a device for trimming when using tree-processing machinery.

2. Description of the Background Art

When processing trees, trimming the tree trunks constitutes a large part of the tree-processing time, whereby a problem is to make the trimming process as efficient as possible, i.e. to achieve as "clean" a trunk as possible. The actual tree harvesting machinery in the form of a felling head or working-up machinery for tree trunks normally includes two pairs of gripping arms, of which at least one pair acts as trimming knives where the arms grip hold of the tree trunk and hold it up against a stop on the tree harvester. To achieve as complete a trimming as possible, this stop can be designed as a third trimming knife that is fixed in position or spring-cushioned against the tree trunk. The gripping arms and the trimming knives of the tree harvester have a radius of curvature sufficient to be able to grasp the sizes that are found, i.e. tree trunks with diameters of about 60 cm. As the diameter of the trunk decreases during the course of the travel of the trunk through the machinery, the trunk will certainly be lifted up against the third knife with the help of the gripping arms but, due to their relatively large radius of curvature that is normally adapted to the thicker part of the trunk, the trimming will become less effective the more the diameter of the trunk decreases.

SUMMARY OF TEE INVENTION

The aim of the invention is to achieve effective trimming even of the narrower part of the tree trunk, which is possible through the invention having the characteristics stated in the claims.

BRIEF DESCRIPTION OF THE DRAWINGS

The invention will be described in the form of examples with reference to the drawings where.

Figure 1:
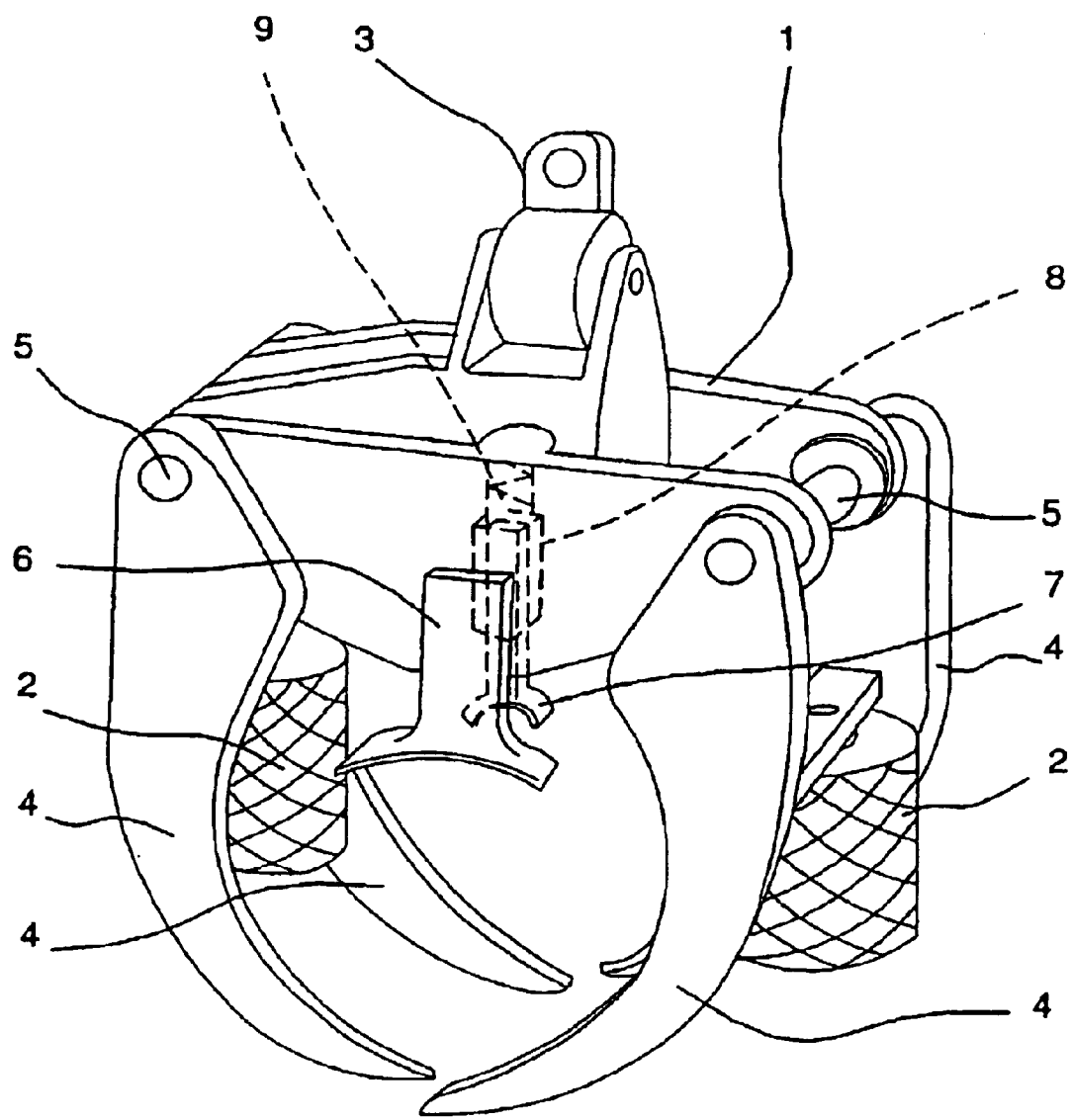
FIG. 1 shows schematically harvesting machinery for trimming tree trunks and FIGS. 2 and 3 show schematically the actual invention in greater detail.

The per se known harvesting machinery for trimming tree trunks (see FIG. 1) consists of a frame 1 with two feed rollers 2 that act on the tree trunk on either side of it to feed the trunk forward for trimming and cutting. As is only indicated in the drawing in FIG. 1, the feed rollers are in the known manner provided with a net-formed pattern of chains to increase the force of interaction with the tree trunk. The machinery is intended to be suspended by means of a coupling device 3 from the arm of a crane of a forestry vehicle. This type of machinery is normally equipped with a cutting device to cut the tree trunk into suitable lengths and that for the sake of simplicity is not indicated in FIG. 1. Reference numeral 4 designates two pairs of gripping arms on the frame 1 and mounted to pivot around axles 5, of which the two front gripping arms when viewed in the direction of feeding are developed as trimming knives. The feed rollers 2, the gripping arms 4 and the cutting device (not shown) are driven by means of hydraulic fluid in a known manner.

In addition, the machinery includes a fixed third trimming knife 6 that also forms a counter stay for the tree trunk grasped by the gripping arms 4.

During trimming, the machinery normally grasps with the gripping arms 4 around the thicker end of the tree trunk. As the tree trunk is displaced in relation to the machinery and the diameter of the trunk decreases, the gripping arms 4 successively lift the trunk to abut the third trimming knife 6. In the conventional way, the trunk is cut with the help of the cutting device (not shown) into suitable lengths as the trunk is displaced in relation to the machinery.

The radius of curvature of the third trimming knife 6 is in principle equivalent to the radius of curvature of the gripping arms 4 that are provided with trimming knives. These radii of curvature are in principle adapted to that normally found when felling the intended trees, i.e. trees with a diameter of about 60 cm at the butt end, which means that as the trunk is displaced through the machinery, the trimming knives act on it via an ever decreasing or narrower peripheral area of the trunk, which thereby becomes increasingly poorly trimmed as the part that moves through the machinery becomes thinner and thinner.

To achieve a fully satisfactory trimming along the whole tree trunk, a complementary trimming knife 7 is arranged according to the invention. This is accommodated, for example, so that it can move in a telescopic manner via a casing 8 permanently fixed in the frame 1. A spring 9 (indicated in FIG. 1) acts with its tensioned force in such a direction that the trimming knife 7 is pressed downwards towards the tree trunk currently found in the machinery.

Figure 2:
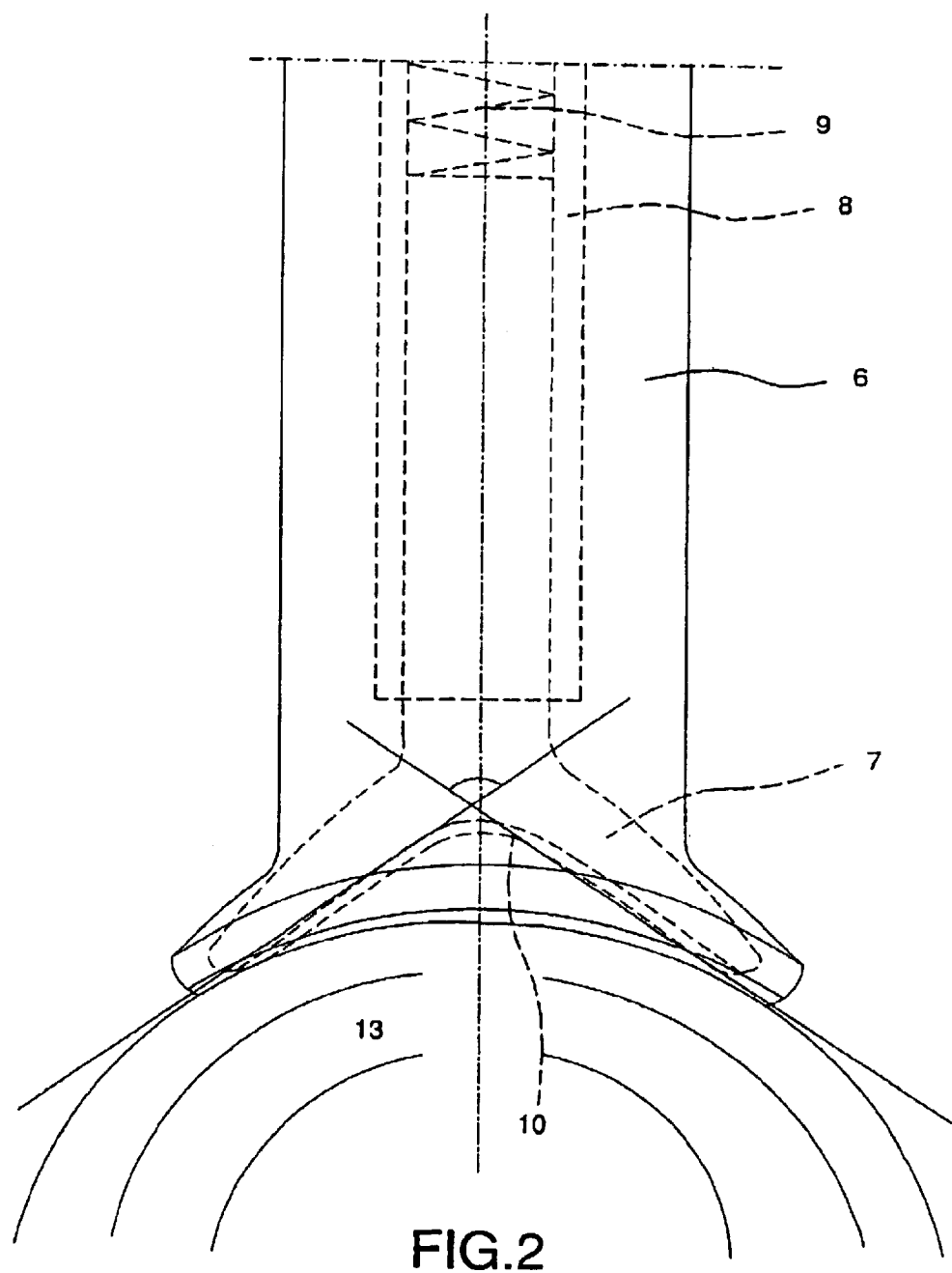
Figure 3:
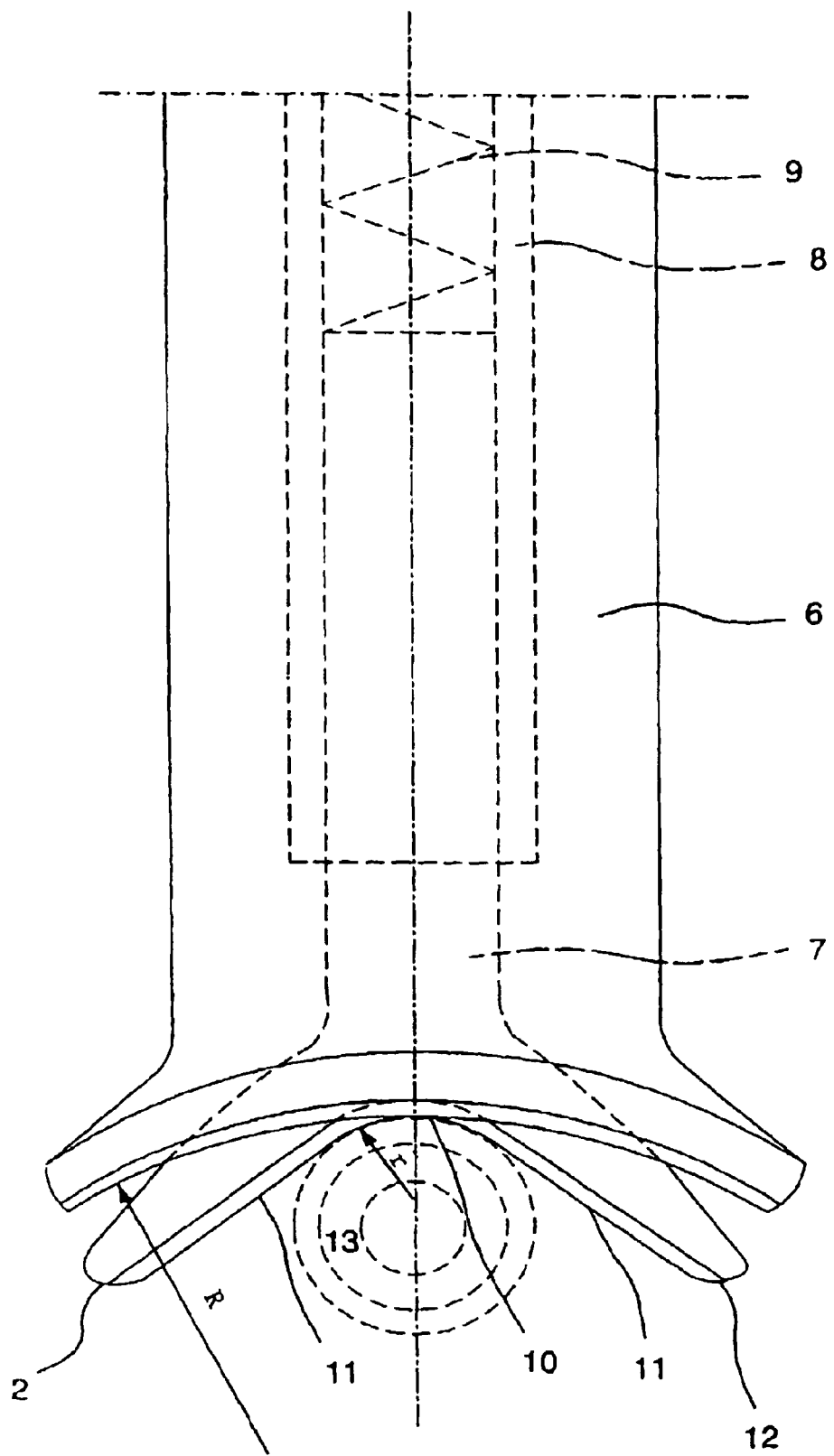

As is evident in more detail in FIGS. 2 and 3, the complementary sprung trimming knife 7 is provided with a knife that in principle has the shape of a V whose bottom forms an essentially circular arch-shaped part 10 with a radius of curvature r that is significantly less than the radius of curvature R of the third trimming knife 6. The essentially circular arch-shaped part 10 of trimming knife 7 merges into two essentially straight shanks 11 that can form an angle with one another of between 90°–120°. Examples of values for R and r can be 30 cm respectively 3 cm. It should nevertheless be realized that the knife radii R and r can be adapted for the intended dimensions of the trees that are to be worked.

During the grasping of the trunk at the butt end and its displacement through the machinery, the gripping arms 4 that are provided with trimming knives will, like the third fixed trimming knife 6, trim the tree trunk in the conventional manner. Because of the large diameter of the trunk in relation to the gap of the complementary, moveable trimming knife 7 formed by the circular segment and shanks 11, the trimming knife will only slide against the trunk via its end surfaces 12, which are intended for this purpose. As the trunk is displaced through the machinery, the diameter of the trunk decreases, which means that the moveable trimming knife 7 will increasingly "sink downwards" to straddle the trunk and with its edge, initially with that of the shanks 11, to act on the trunk and therefore trim it more effectively than the fixed knife 6, against which knife 6 the trunk is nevertheless held by the gripping arms 4 during the whole time.

FIG. 2 thus shows schematically the fixed trimming knife 6 with the radius of curvature R. FIG. 2 assumes that the machinery grasps the thicker part of the tree trunk 13, which is trimmed effectively by the trimming knives 4 and the third, fixed trimming knife 6. In this case, as has been mentioned, the complementary, moveable trimming knife 7 with its end surfaces 12 slides down towards the trunk. As the trunk is displaced through the machinery 1, its diameter is reduced and the complementary, moveable trimming knife 7 acts increasingly against the trunk, as indicated in FIG. 3.

It is appropriate that the complementary, spring-tensioned trimming knife 7 is located downstream of the fixed trimming knife 6 seen from the direction of travel of the trunk through the machinery.

It should be realized that within the scope of the invention, the shanks 11 of knife 7 do not need to be perfectly straight but can have a slight curvature, and that the spring tensioning and the movement of the knife 7 can be achieved in a number of different ways within the scope of knowledge for a person skilled in the art. Similarly, the positioning of the spring-tensioned knife 7 can be different from that described here.

What is claimed is:

1. Device in a tree harvester head for trimming a tree trunk from a butt end to a top end comprising:
   (a) a frame supporting feed rollers;
   (b) at least one pivoting trimming knife on the frame, the at least one pivoting trimming knife being pivotable towards and away from the tree trunk, the at least one pivoting trimming knife having a radius of curvature;
   (c) a trimming knife permanently fixed to the frame and having a radius of curvature that is essentially equivalent to the radius of curvature of each pivoting trimming knife; and
   (d) a complementary moveable trimming knife arranged in a displaceable manner on the frame and biased by a spring in a direction toward; the tree trunk that is to be worked, the complementary moveable trimming knife has an area of grip around the tree trunk that is significantly less than an area of grip of the at least one pivoting trimming knife and an area of grip of the fixed trimming knife when working the butt end of the tree trunk and an urea of grip around the tree trunk that is greater than an area of grip of the at least one pivoting trimming knife and the area of grip of the fixed trimming knife when working the top end of the tree trunk for trimming the tree trunk from the butt end to the top end.

2. Device according to claim 1, wherein the complementary moveable trimming knife is essentially V-shaped with a rounded bottom an well as shanks extending from the rounded bottom and opening against the tree trunk that is to be worked.

3. Device according to claim 2, wherein the complementary moveable trimming knife is arranged after the fixed trimming knife as seen from a direction of travel of the tree trunk during trimming.

4. Device according to claim 3, wherein the radius of curvature of the fixed trimming knife and a radius of curvature of the rounded bottom of the moveable trimming knife have a relation which lies between 6:1 and 9:1.

5. Device according to claim 4, wherein the shanks form an angle with one another of around 90°–120°.

6. Device according to claim 2, wherein the radius of curvature of the fixed trimming knife and a radius of curvature of the rounded bottom of the moveable trimming knife have a relation which lies between 6:1 and 9:1.

7. Device according to claim 6, wherein the shanks form an angle with one another of around 90°–120°.

8. Device according to claim 2, wherein the shanks form an angle with one another of around 90°–120°.

9. Device according to claim 1, wherein the complementary moveable trimming knife is arranged after the fixed trimming knife as seen from a direction of travel of the tree trunk during trimming.

10. Method of using tree harvesting machinery for trimming a tree trunk from a butt end to a top end, the method comprising the steps of:
    (a) providing a frame with at least one pivoting trimming knife that pivots toward and away from the tree trunk, each pivoting trimming knife has a radius of curvature, a trimming knife permanently fixed to the frame and having a radium of curvature that is essentially equivalent to the a radius of curvature of each pivoting trimming knife, and a complementary trimming knife that is spring-tensioned and has an extension for trimming;
    (b) bringing the complementary trimming knife to abut the tree trunk that is to be worked; and
    (c) trimming the tree trunk from the butt end to the top end with the extension for trimming straddling a smaller diameter of the tree trunk than the radius of the curvature of the fixed trimming knife is intended to straddle.

* * * * *

UNITED STATES PATENT AND TRADEMARK OFFICE
CERTIFICATE OF CORRECTION

PATENT NO. : 6,758,248 B2
DATED : July 6, 2004
INVENTOR(S) : Gunnar Nilsson et al.

It is certified that error appears in the above-identified patent and that said Letters Patent is hereby corrected as shown below:

Column 1,
Lines 4 and 32, "TEE" should be -- THE --.

Column 3,
Line 33, "urea" should be -- area --.
Line 41, "an" should be -- as --.

Signed and Sealed this

Seventh Day of September, 2004

JON W. DUDAS
*Director of the United States Patent and Trademark Office*